United States Patent [19]

Taylor

[11] Patent Number: 4,524,811
[45] Date of Patent: Jun. 25, 1985

[54] ENGINE OIL SAMPLING DEVICE

[76] Inventor: Julian S. Taylor, 8300 SW. 8, Oklahoma City, Okla. 73108

[21] Appl. No.: 636,787

[22] Filed: Aug. 1, 1984

Related U.S. Application Data

[63] Continuation-in-part of Ser. No. 438,240, Nov. 1, 1982, abandoned.

[51] Int. Cl.³ .............................................. B65D 51/16
[52] U.S. Cl. .................................... 141/325; 184/1.5; 220/361
[58] Field of Search ................. 128/760, 763; 141/1, 141/285, 301, 325, 326, 327, 329, 330; 184/1.5; 220/1 C, 1 S, 85 SF, 85 SP, 86 R, 254, 352, 361, 363; 222/472; 251/149.7

[56] References Cited

U.S. PATENT DOCUMENTS

| | | | |
|---|---|---|---|
| 2,962,307 | 11/1960 | Nebinger | 141/330 |
| 3,727,638 | 4/1973 | Zaremba, Jr. et al. | 184/1.5 |
| 3,806,085 | 4/1974 | Codo | 184/1.5 |
| 4,125,207 | 11/1978 | Ernst et al. | 220/85 SP |
| 4,189,072 | 2/1980 | Conn | 220/85 SP |
| 4,269,237 | 5/1981 | Berger | 141/330 |
| 4,269,332 | 5/1981 | Conn | 220/85 SP |

Primary Examiner—Stephen Marcus
Assistant Examiner—Mark Thronson
Attorney, Agent, or Firm—Robert K. Rhea

[57] ABSTRACT

An engine oil sampling device for use with an engine containing a quantity of lubricating oil and having a self-sealing centrally bored access plug connected to an engine wall.

In one embodiment a tubular assembly is connected, at one end, with a container with its other end coaxially supporting a tubular needle capable of entering the access plug for filling the container.

In another embodiment, the tubular assembly is provided, at one end, with a wall portion defining a screw cap for closing the open end of an upwardly open cylindrical container. In both embodiments a grommet frictionally receives the tubular needle to prevent loss of oil from the container.

4 Claims, 4 Drawing Figures

U.S. Patent  Jun. 25, 1985  4,524,811
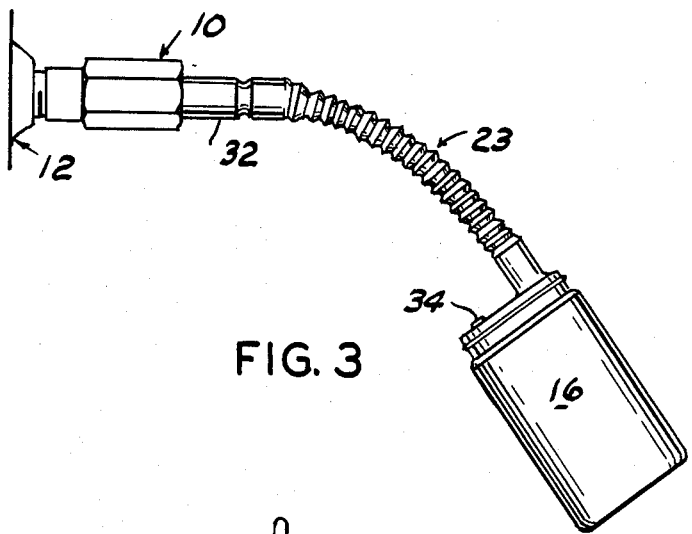
FIG. 3
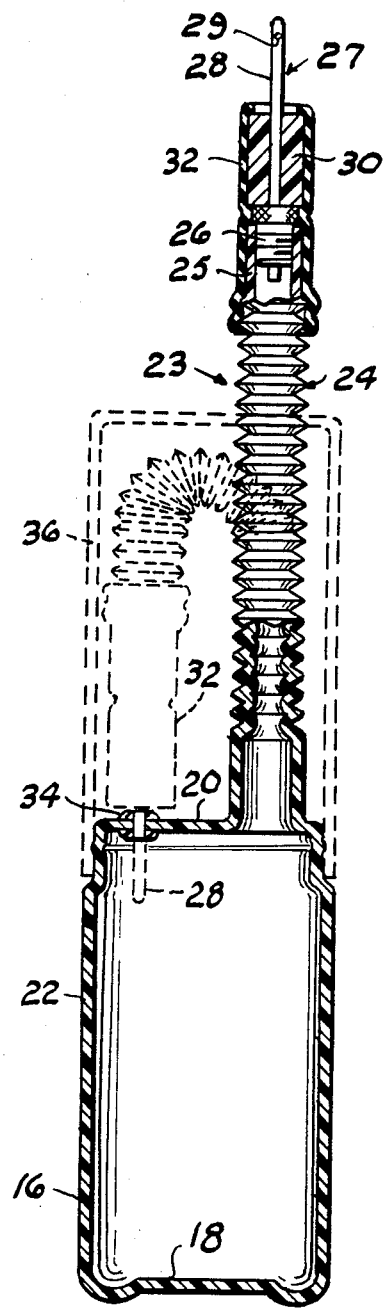
FIG. 2
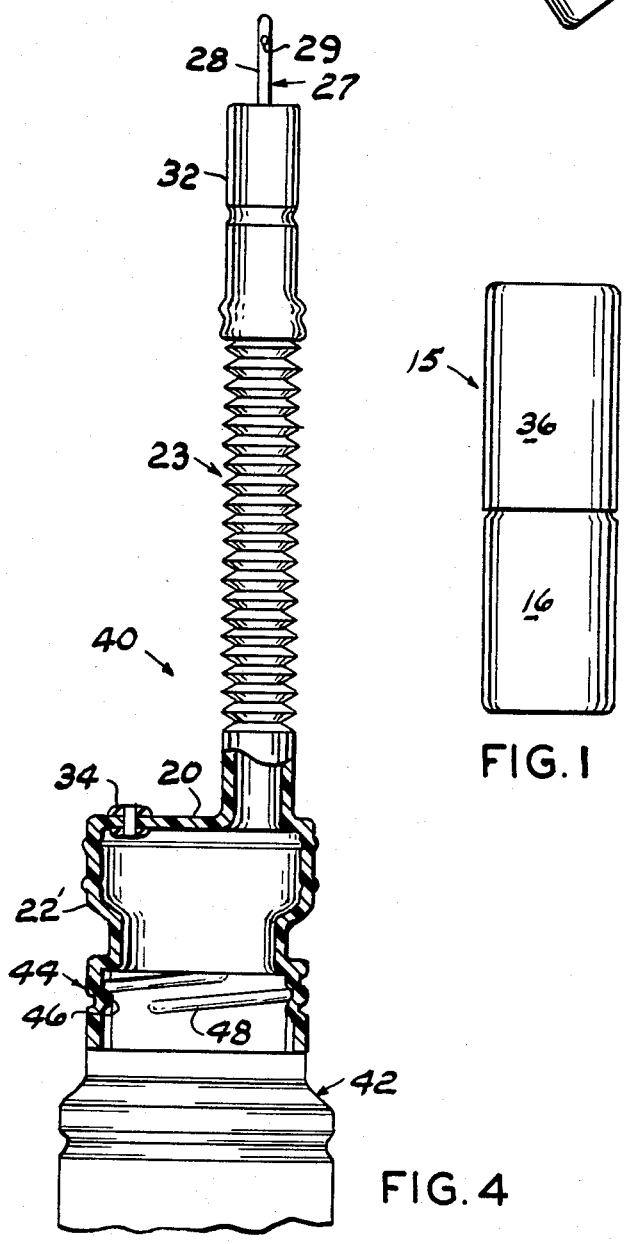
FIG. 1
FIG. 4

ENGINE OIL SAMPLING DEVICE

This application is a continuation-in-part, of application Ser. No. 438,240, filed Nov. 1, 1982, now abandoned.

BACKGROUND OF THE INVENTION

1. Field of the Invention

The present invention relates to internal combustion engines and more particularly to a device for obtaining a sample of the engine lubricating oil preferably during operation of the engine.

In the maintenance of internal combustion engines, such as, but not limited to, over-the-road tractors, railway locomotives, and the like, it is common practice to obtain a sample of the engine lubricating oil for analysis. By analyzing the various elements in suspension in the oil, a determination is made of the condition of the engine moving parts and when it is necessary that the engine undergo an overhaul.

This type of analysis may be termed preventive maintenance in that upon learning the condition of the engine components, the engine may be serviced while near a service area rather than resulting in a break-down while operating away from a point of maintenance or service.

2. Description of the Prior Art

In obtaining samples of engine lubricating oil it has been common practice to insert a tube into the engine crankcase area through the dip stick access opening while the engine is idle. The inserted tube is connected with a pressure reducing bulb or apparatus for drawing a quantity of the engine lubricant out of the crankcase which is received by a suitable receptacle. This procedure has the disadvantage of contaminating the crankcase oil sample by other impurities not normally present in the crankcase oil, such as are found on the interior of the dip stick access opening. Further, the sample device is frequently used for successively containing a plurality of engine oil samples thereby transferring some of the impurities from one engine oil sample to another by the sampling device. Additionally, such a sample obtaining apparatus is not usually capable of being sealed, as a separate unit, while awaiting its turn for the analyzing function.

This invention is distinctive over the present procedure by providing an oil sample obtaining device which is relatively inexpensive and therefor may be discarded after a one time use, one of the devices being used for each engine oil sample obtained. Further, the device operates in combination with an access plug installed on the engine or one of its oil conducting lines and is capable of being sealed fluid tight after obtaining an oil sample for mailing, shipping or awaiting its turn to be analyzed.

SUMMARY OF THE INVENTION

In its preferred embodiment, a generally cylindrical container is integrally connected at one of its ends with one end of an elongated flexible tube capable of being bent to describe an inverted U or return bend without collapsing its wall and closing its bore. The other end of the flexible tube is secured to a ball air inflating needle adapted to be coaxially received by a self-sealing plug connected with an engine in communication with the lubricating oil therein. When not in use, the flexible tube is bent to describe a return bend and the needle inserted fluid tight into the container through a grommet therein. The grommet serves to exhaust air from the container while being filled with lubricating oil. A cap covers the bent tube when the device is not in use.

In another embodiment, the needle equipped section of flexible tubing is provided with a screw threaded cap portion for threadedly engaging the neck of an existing normally screw cap closed container. The flexible tube equipped cap may also have an air exhaust grommet in an opening for receiving the needle.

The principal object of this invention is to provide a relatively inexpensive internal combustion engine lubricating oil sampling device in combination with an engine oil access plug for obtaining a sample of the engine oil while the engine is operating.

BRIEF DESCRIPTION OF THE DRAWINGS

FIG. 1 is an elevational view of the device in stored position;

FIG. 2 is a vertical cross sectional view, to a larger scale, of the device with the flexible tubing extended and illustrating, by dotted lines, the cover in place over the folded flexible tubing;

FIG. 3 is a side elevational view illustrating the relative position of the device when receiving an oil sample from a self-sealing plug connected with an engine; and FIG. 4 is a vertical cross sectional view similar to FIG. 2, partially in elevation, of an alternative embodiment threadedly connected with a conventional screw cap type container.

DESCRIPTION OF THE PREFERRED EMBODIMENTS

Like characters of reference designate like parts in those figures of the drawings in which they occur.

In the drawings:

The reference numeral 10 indicates an access plug connected with an oil lubricating line or the crankcase 12 of an internal combustion engine. The access plug 10 is described in my U.S. Pat. No. 3,794,289 and is marketed under the Trademark GAUGE PLUG. Briefly stated, the plug comprises a cylindrical member threadedly connected at one end with the crankcase 12. The plug is centrally bored for communication with the interior of the crankcase or other vessel and for receiving a relatively small diameter tubular probe communicating at its inner end with lubricating oil contained by the crankcase. The plug bore is provided with sealing means which close the bore when the plug is not in use and seal fluid tight with the periphery of an inserted probe. The above description forms no part of this invention other than to set forth the combination with which the present invention is used.

The reference numeral 15 indicates the preferred embodiment of the sampling device, which is generally cylindrical, principally formed, as by blow molding, from clear or translucent plastic material. The device 15 includes a container 16 having a bottom wall 18 and a top wall 20 joined by a side wall 22. Elongated tube means 23, including a length of flexible tubing 24, is integrally joined at one end in eccentric relation to the top wall 20 parallel with the longitudinal axis of the container. The other end portion 25 of the flexible tubing frictionally receives coaxially the threaded end portion 26 of an air inflation needle 27 of the type used to inflate a basketball, football, mattress, or the like. The needle includes an outwardly projecting closed end rigid tube portion 28 having an opening 29 in its wall adjacent its closed end. The closed end needle with an opening in its wall adjacent the closed end is preferred to prevent damage to the sealing means of the access plug, however, an open end needle having a lateral slot or wall opening at or at least closely spaced with respect to its open end may be used. The lateral opening in the needle wall near the open end is necessary to insure fluid communication through the needle in the event the open end of the needle contacts a spherical or part-spherical sealing member in the access plug opening which would or at least tend to preclude fluid flow through the needle open end.

A cylindrical finger grip member 30 coaxially surrounds a portion of the rigid tube 28 opposite the flexible tubing end portion 25 for the purpose of manipulating the free end portion of the tube assembly, as presently explained. The flexible tubing end portion 25 and finger grip member 30 are preferably surrounded by a length of heat shrink tubing 32 to prevent separation of the needle from the flexible tubing.

Intermediate its ends, the wall of the flexible tubing 24 is formed in substantial accordion fashion to permit bending the tubing in a substantially U-shape or a return bend without collapsing its wall and closing its bore, as illustrated by dotted lines (FIG. 2), for the purpose of inserting the outwardly projecting tube portion 28 of the needle through a needle sealable means comprising a grommet 34 installed in or formed as an opening in the container top wall 20 to prevent the loss of oil, not shown, within the container 16 and for the purpose of shipping and storage of the sampler. A cylindrical cover 36 surrounds the doubled back upon itself tubing 24 and frictionally engages the wall of the container adjacent its top 20.

OPERATION

In the operation of the preferred embodiment, with the engine 12 operating, the device is disposed in substantially the position illustrated by FIG. 3 and the needle point 28 is inserted axially into the plug 10. Lubricating oil under engine oil pump pressure then flows through the needle 27 and flexible tube 24 into the container 16 with air being exhausted from the container through the top wall grommet 34. After obtaining the desired quantity of oil, not shown, the needle 27 is withdrawn from the plug and inserted through the grommet 34, as illustrated by FIG. 2. The cap 36 is then installed for transporting the device to an analyzer.

The reference numeral 40 (FIG. 4) indicates an alternative embodiment of the device intended primarily for use in obtaining oil samples where a quantity of conventional screw cap closed containers 42 are on hand or are readily available. The device 40 is similarly preferably formed from transparent or translucent plastic material by the blow molding method and includes the tubing means 23 joined to the top wall 20, the air inflater 27, the finger grip 30 and the heat shrink tubing 32. In the example shown, the top wall 20 is similarly provided with the grommet 34.

The wall portion 22', depending from the top 20, is deformed intermediate its ends to define a cooperating cap portion 44 having internal threads 46 cooperatively engaging threads 48 formed on the neck portion of the container 42. That portion of the outer surface of the wall 22', adjacent the top 20, similarly frictionally receives the cap 36 when inverted thereover after inserting the needle 27 into the grommet 34.

In the operation of the alternative embodiment 40, the cap portion 44 is threadedly engaged with the container 42 and an oil sample obtained in the manner described hereinabove for the preferred embodiment. After obtaining the oil sample, the device 40 is usually removed from the container 42 and discarded, the container being closed fluid tight by its conventional cap, not shown.

Obviously the invention is susceptible to changes or alterations without defeating its practicability. Therefore, I do not wish to be confined to the preferred embodiment shown in the drawings and described herein.

I claim:

1. In an engine containing a quantity of lubricating oil and having a centrally bored self-sealing access plug connected with a wall of the engine in communication with the oil, the improvement comprising:

an oil sample receiving container;
a length of flexible tubing connected at one end with said container;
a hollow needle axially connected with the other end of said tubing,
said needle having an elongated tubular portion adapted at its end opposite said tubing for entering said access plug and filling said container with oil,
said tubular portion having a wall,
said tubular portion having an opening in its wall adjacent its said opposite end; and,
means including a grommet on the wall of said container for exhausting air during the filling of the container and for thereafter frictionally receiving and sealing with an intermediate portion of said tubular portion.

2. The combination according to claim 1, in which said container is a closed end cylindrical container.

3. The combination according to claim 1 in which said flexible tubing is characterized by an accordian-shaped wall portion intermediate its end.

4. The combination according to claim 1 in which said container is cylindrical with an upwardly open end and further including:
a container cap closing the open end of said container and connected with said one end of the tubing.

* * * * *